(12) United States Patent
Askan

(10) Patent No.: US 11,588,321 B2
(45) Date of Patent: Feb. 21, 2023

(54) LOW-VOLTAGE PROTECTION SWITCH UNIT

(71) Applicant: EATON INTELLIGENT POWER LIMITED, Dublin (IE)

(72) Inventor: Kenan Askan, Vienna (AT)

(73) Assignee: EATON INTELLIGENT POWER LIMITED, Dublin (IE)

( * ) Notice: Subject to any disclaimer, the term of this patent is extended or adjusted under 35 U.S.C. 154(b) by 236 days.

(21) Appl. No.: 16/479,943

(22) PCT Filed: Dec. 11, 2017

(86) PCT No.: PCT/EP2017/082214
§ 371 (c)(1),
(2) Date: Jul. 23, 2019

(87) PCT Pub. No.: WO2018/137833
PCT Pub. Date: Aug. 2, 2018

(65) Prior Publication Data
US 2019/0341769 A1 Nov. 7, 2019

(30) Foreign Application Priority Data
Jan. 25, 2017 (DE) .................. 10 2017 101 451.9

(51) Int. Cl.
*H03K 17/16* (2006.01)
*H02H 7/085* (2006.01)
*H02H 1/00* (2006.01)

(52) U.S. Cl.
CPC ........ *H02H 7/0856* (2013.01); *H02H 1/0007* (2013.01)

(58) Field of Classification Search
CPC ............... H02H 7/0856; H02H 1/0007; H01H 2009/544; H01H 9/547; H01H 9/542
See application file for complete search history.

(56) References Cited

U.S. PATENT DOCUMENTS 6,459,606 B1   10/2002  Jadric
6,934,141 B2*   8/2005  Hamano ................ H01H 9/542
                                                     361/160

(Continued)

FOREIGN PATENT DOCUMENTS

EP    1619781 A1    1/2006
WO    WO 2015028634 A1    3/2015

*Primary Examiner* — Muhammad S Islam
(74) *Attorney, Agent, or Firm* — Leydig, Voit & Mayer, Ltd.

(57) ABSTRACT

A low-voltage protection switch unit, such as a motor protection switch, includes: at least an external conductor line, from an external line supply terminal of the low-voltage protection switch unit to an external line load terminal of the low-voltage protection switch unit; a neutral conductor line, from a neutral conductor terminal of the low-voltage protection switch unit to a neutral conductor load terminal of the low-voltage protection switch unit; a mechanical bypass switch arranged in the external conductor line; a semiconductor circuit arrangement connected in parallel with the mechanical bypass switch; an electronic control unit for actuating the mechanical bypass switch and the semiconductor circuit arrangement in a specifiable manner; and a current measurement arrangement connected to the electronic control unit, the current measurement arrangement being arranged at least in the external conductor line. The electronic control unit switches the semiconductor circuit arrangement on/off in a specifiable clocked manner.

12 Claims, 2 Drawing Sheets

(56) References Cited

U.S. PATENT DOCUMENTS

| | | | |
|---|---|---|---|
| 9,134,379 B2 | 9/2015 | Lang | |
| 9,450,396 B2* | 9/2016 | Sarrus | H01H 33/596 |
| 10,374,410 B2* | 8/2019 | Niehoff | H01H 9/542 |
| 2003/0202296 A1* | 10/2003 | Hamano | H01H 9/542 |
| | | | 361/2 |
| 2007/0121257 A1* | 5/2007 | Maitra | H01H 9/542 |
| | | | 361/2 |
| 2010/0244803 A1* | 9/2010 | Bernacchia | H02M 3/1584 |
| | | | 323/288 |
| 2011/0062933 A1* | 3/2011 | Tosuntikool | H02M 5/2573 |
| | | | 200/19.01 |
| 2011/0109254 A1* | 5/2011 | Krause | H02M 1/36 |
| | | | 318/400.17 |
| 2011/0317321 A1* | 12/2011 | Vogel | H02H 3/025 |
| | | | 361/87 |
| 2015/0054517 A1* | 2/2015 | Yonezaki | B60L 3/0046 |
| | | | 324/418 |
| 2016/0203932 A1* | 7/2016 | Niehoff | H02H 3/025 |
| | | | 361/170 |
| 2017/0011875 A1* | 1/2017 | Dorn | H01H 33/596 |
| 2017/0236676 A1* | 8/2017 | Bartonek | H01H 89/08 |
| | | | 361/115 |
| 2018/0226208 A1* | 8/2018 | Heinz | H01H 33/596 |

* cited by examiner

LOW-VOLTAGE PROTECTION SWITCH UNIT

CROSS-REFERENCE TO PRIOR APPLICATIONS

This application is a U.S. National Phase application under 35 U.S.C. § 371 of International Application No. PCT/EP2017/082214, filed on Dec. 11, 2017, and claims benefit to German Patent Application No. DE 10 2017 101 451.9, filed on Jan. 25, 2017. The International Application was published in German on Aug. 2, 2018 as WO 2018/137833 under PCT Article 21(2).

FIELD

The invention relates to a low-voltage protection switch unit.

BACKGROUND

Electrical installation environments often have inductive or capacitive loads or consumers, which typically draw high currents during switch-on. In this context, for short times, currents occur that are so high that a protection switch upstream from the system in question is activated and the system switches off.

On the one hand, activation of the protection switch in question is unwanted, since this stops the system from starting up and the network has to be set in operation again. On the other hand, this is not an erroneous activation in the true sense, since the current detected by the protection switch actually is high enough to justify activation in normal operation. However, the state in question generally only lasts very briefly, and so there is no risk of damage to the lines.

In particular the operation or startup of electric motors therefore requires substantial systems so as to be able both to operate them reliably and to start them up without interruption.

Devices are known that are provided and appropriately formed to limit the switch-on current when particular types of loads are started up. However, these are only provided for particular types of loads each case. The delta-wye switch, for example, is also known and widespread in particular types of three-phase machines. Other devices of this type are formed specially for capacitive or inductive loads.

The devices in question have the drawback that they are always separate devices that have to be arranged in addition to the officially prescribed devices and that increase the installation complexity. In addition, they are tied to use with particular loads, meaning that a number of different devices of this type have to be provided by the manufacturers or distributors.

SUMMARY

In an embodiment, the present invention provides a low-voltage protection switch unit comprising a motor protection switch, comprising: at least an external conductor line, from an external line supply terminal of the low-voltage protection switch unit to an external line load terminal of the low-voltage protection switch unit; a neutral conductor line, from a neutral conductor terminal of the low-voltage protection switch unit to a neutral conductor load terminal of the low-voltage protection switch unit; a mechanical bypass switch arranged in the external conductor line; a semiconductor circuit arrangement connected in parallel with the mechanical bypass switch; an electronic control unit configured to actuate the mechanical bypass switch and the semiconductor circuit arrangement in a specifiable manner; and a current measurement arrangement connected to the electronic control unit, the current measurement arrangement being arranged at least in the external conductor line, wherein the electronic control unit is configured to switch the semiconductor circuit arrangement on/off in a specifiable clocked manner when the mechanical bypass switch is open so as to limit a switch-on current of a downstream load.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention provides a low-voltage protection switch unit of the type mentioned at the outset, by means of which the aforementioned drawbacks can be avoided and which, without additional equipment, supports starting up or switching on capacitive and inductive consumers, in particular of an electric motor.

As a result, the startup current of both capacitive and inductive loads can be limited reliably without further equipment. As a result, a capacitive or inductive load can be switched on and operated in normal operation substantially as desired merely using a single device, without an additional switch, startup current limiter or protection switch. As a result, it is not necessary to use a separate startup current limiter that is specially adapted to a particular form of load. As a result, the installation complexity and the complexity of an electrical installation arrangement, in particular for operating a high-power load, can be reduced. As a result, the flexibility of an installation arrangement can be increased.

In the operation of an electric motor, as a result of the use of a low-voltage protection switch unit according to the invention, any pieces of equipment that would otherwise be used can be omitted. Only if it were desired to regulate the electric motor would a currently conventional inverter have to be provided. Otherwise, the arrangement found thus far, of a separate motor protection switch in each case and a power switch and a fuse arrangement and a motor starter, can be omitted. As a result, a large number of units can be replaced with merely a single device, and in this way the installation complexity can be greatly reduced.

Figure 1:
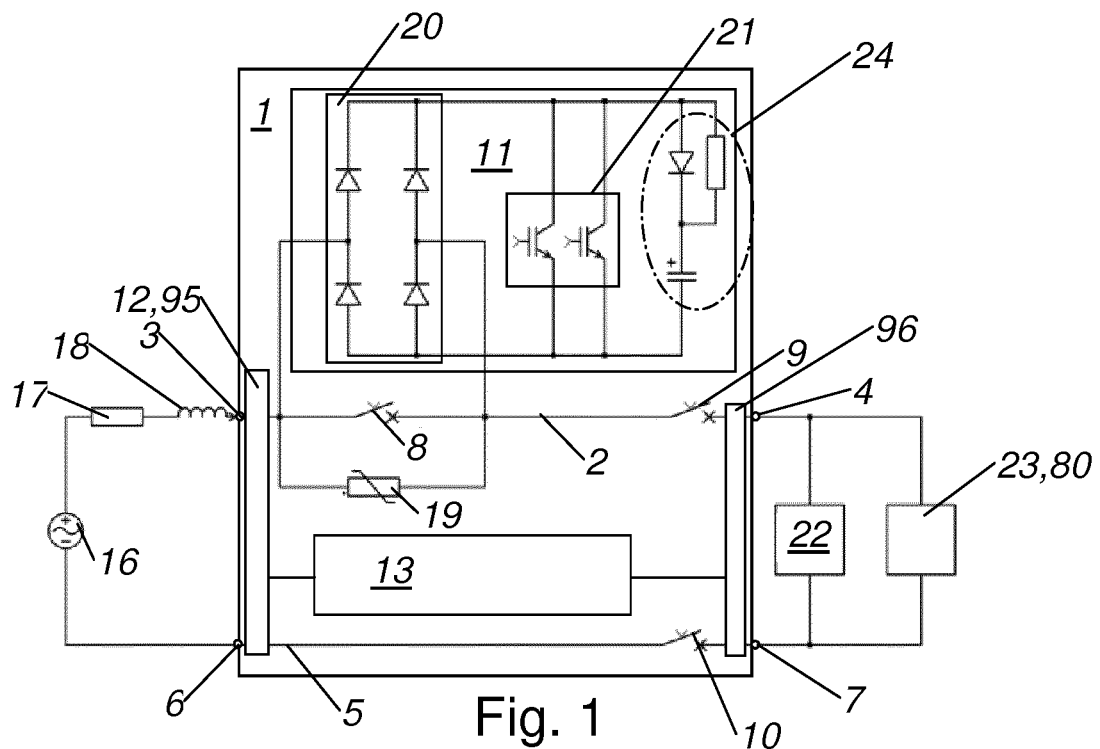
FIG. 1 is a schematic drawing of a first embodiment of a switch unit according to the invention.
Figure 3:
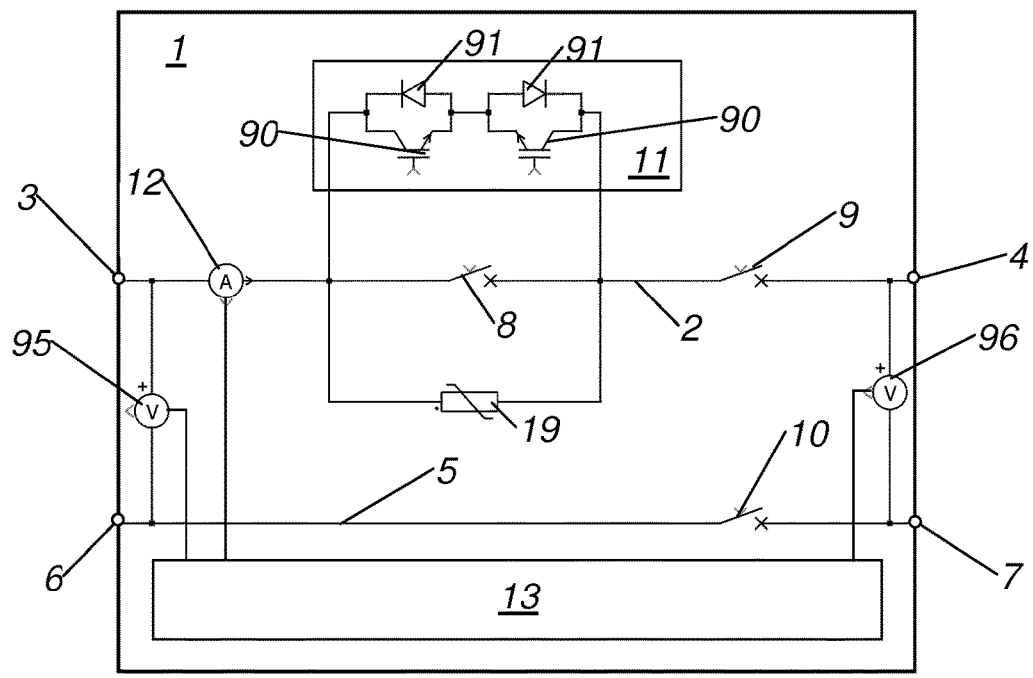
FIG. 3 is a schematic drawing of a second embodiment of a switch unit according to the invention.

FIGS. 1 and 3 each show an embodiment of a low-voltage protection switch unit 1, in particular a motor protection switch, comprising at least an external conductor line 2, from an external line supply terminal 3 of the low-voltage protection switch unit 1 to an external line load terminal 4 of the low-voltage protection switch unit 1, and a neutral conductor line 5, from a neutral conductor terminal 6 of the low-voltage protection switch unit 1 to a neutral conductor load terminal 7 of the low-voltage protection switch unit 1, a mechanical bypass switch 8 being arranged in the external conductor line 2, a semiconductor circuit arrangement 11 of the low-voltage protection switch unit 1 being connected in parallel with the bypass switch 8, a current measurement arrangement 12 that is connected to an electronic control unit 13 of the protection switch unit 1 being arranged at least in the external conductor line 2, the electronic control unit 13 being formed to actuate the bypass switch 8 and the semiconductor circuit arrangement 11 in a specifiable manner, the control unit 13 being formed to switch the semiconductor circuit arrangement 11 on/off in a specifiable clocked manner when the bypass switch 8 is open so as to limit a switch-on current of a downstream load 23.

As a result, the startup current of both capacitive and inductive loads 23 can be limited reliably without further equipment. As a result, a capacitive or inductive load 23 can be switched on and operated in normal operation substantially as desired merely using a single device, without an additional switch, startup current limiter or protection switch. As a result, it is not necessary to use a separate startup current limiter that is specially adapted to a particular form of load. As a result, the installation complexity and the complexity of an electrical installation arrangement, in particular for operating a high-power load 23, can be reduced. As a result, the flexibility of an installation arrangement can be increased.

The low-voltage protection switch unit 1 according to the invention and the protection switch unit according to WO 2015/028634 A1 are both low-voltage protection switch units. Low voltage refers, as is conventional per se, to the range up to 1,000 V alternating current or 1,500 V direct current.

Figure 2:
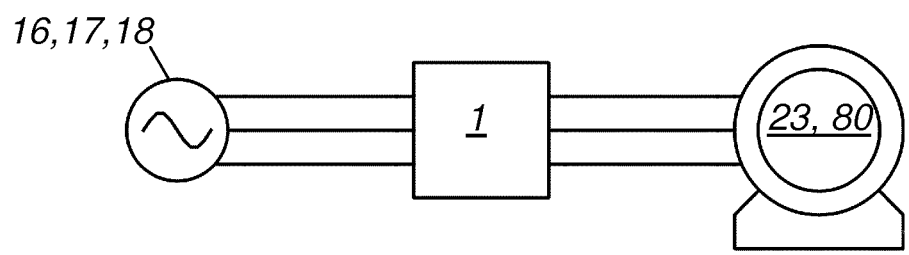
FIG. 2 is a schematic drawing of a first preferred embodiment of an electric motor connecting line.

FIGS. 1 and 2 show protection switch units according to the invention. These have at least an external conductor line 2 and a neutral conductor line 5, configurations for alternating current, comprising three external conductor lines 2, also being provided. The external conductor line 2 extends through the protection switch unit 1 from an external conductor supply terminal 3 to an external conductor load terminal 4. The neutral conductor line 5 extends through the protection switch unit 1 from a neutral conductor terminal 6 to a neutral line load terminal 7. The terminals 3, 4, 6, 7 in question are each preferably formed as screw terminals or plug-in terminals and arranged in the protection switch unit 1 so as to be accessible from the outside.

The protection switch unit 1 preferably has an insulating material housing.

A mechanical bypass switch 8 comprising single or multiple contact interruption is arranged in the external conductor line 2. Preferably and as shown, in the low-voltage protection switch unit 1 a first mechanical circuit breaker 9 is further arranged in the external conductor line 2 in series with the bypass switch 8. A second mechanical circuit breaker 10 is arranged in the neutral conductor line 5. A semiconductor circuit arrangement 11 is connected in parallel with the bypass switch 8. The circuit breakers 9, 10 may also be arranged at another point in the low-voltage protection switch unit 1 if this achieves galvanic separation of the connected load 23 from the network 16.

A surge arrester 19 is further connected in parallel with the bypass switch 8.

The protection switch unit 1 further has a current measurement arrangement 12, which is arranged in the external conductor line 2 and which is preferably formed comprising a shunt resistor or a current transformer.

The current measurement arrangement 12 is connected to an electronic control unit 13 of the protection switch unit 1, which is preferably formed comprising a microcontroller or microprocessor. The electronic control unit 13 is formed to actuate the bypass switch 8 and the first semiconductor circuit arrangement 11, as well as the first mechanical circuit breaker 9 and the second mechanical circuit breaker 10, and thus to actuate them or switch them on in a specifiable manner. For this purpose, the electronic control unit 13 is connected in terms of circuitry to the first semiconductor circuit arrangement 11 and further to, in particular electromagnetic, actuation elements of the mechanical switch, and thus the bypass switch 8, of the first mechanical circuit breaker 9 and the second mechanical circuit breaker 10. The corresponding connections originating from the electronic control unit 13 are not shown in FIG. 1.

The first semiconductor circuit arrangement 11 preferably has a rectifier circuit 20, which is preferably formed as a full bridge, as well as, in the embodiment of FIG. 1, two power semiconductors 21, which according to the invention are formed as IGBTs, as intrinsic switching or regulation elements. In this context, a relatively large power semiconductor 21 may also be provided.

Alternatively, the use of a back-to-back IGBT 90 as a semiconductor element may also be provided. FIG. 3 shows a correspondingly formed low-voltage protection switch unit 1. An antiparallel diode 91 is assigned to each of the back-to-back IGBTs 90. Aside from the configuration of the semiconductor circuit arrangement 11, the two embodiments of the low-voltage protection switch unit 1 are substantially identical.

IGBTs as actual switching elements have the advantage that they can switch high powers and can be switched off more simply than a thyristor.

Particularly preferably, it is provided that the semiconductor circuit arrangement 3 is formed as a bidirectional H-bridge or H-switching-regulator. As a result, operation that is independent of the type of load is possible. As a result, the transient response of both a capacitive and an inductive load 6 can be regulated.

In FIG. 1, in addition to the actual protection switch unit 1, the electrical environment is also indicated. In this context, the power network is represented by the AC/DC supply voltage source 16, the network internal resistance 17 and the network inductance 18. Further, an electric load 23, in particular an electric motor 80, and an electrical fault 22 in the form of a short circuit are shown.

In a switch unit according to FIG. 1, it is provided that a switch-off process is carried out by the bypass switch 8 and the first semiconductor circuit arrangement 11, and the first and second circuit breakers 9, 10 merely serve to ensure galvanic separation of the load circuit after switch-off is completed.

In addition to the protective function, the low-voltage protection switch unit 1 according to the invention is also provided to switch an, in particular capacitive or inductive, load 6 on and off in normal operation. In particular, it is provided to use the protection switch unit 1 according to the invention in the form of or in place of a motor protection switch for normal operation of an electric motor 80.

It is therefore provided that the control unit 13 is formed to switch the semiconductor circuit arrangement 11 on/off in a specifiable clocked manner when the bypass switch 8 is open so as to limit a switch-on current of a downstream load 23. The previously described switch-off functions of the low-voltage protection switch unit 1, predominantly when a short circuit occurs, are unaffected by this. It is therefore preferably provided to switch off a surge or a short circuit directly, and thus without previously limiting the current by means of the methods described according to the invention for limiting switch-on currents.

In this context, different types of clocking may be provided. In particular, it is provided that the control unit 13 is formed to switch the semiconductor circuit arrangement 11 on/off in accordance with a pulse-width modulation. This has be found to be particularly suitable for implementation in practice.

Preferably, it is further provided that the control unit 13 is connected to the current measurement arrangement 12 and that the control unit 13 is formed to adapt the on/off switching times as a function of a measured load current. This forms a regulation circuit that makes more exact limitation of the switch-on current possible.

In this context, it is preferably further provided that a first voltage measurement arrangement 95 is arranged in the region of the network-side terminals 3, 6 and a second voltage measurement arrangement 96 is arranged in the region of the load-side terminals 4, 7 and these are each connected to the control unit 13. By way of the voltage measurement at the network-side terminals 3, 6, the zero crossing of the applied voltage can be detected. As a result of the voltage measurement at the load-side terminals 4, 7, the voltage at the load during pulse-width modulation can be measured and taken into account.

The control unit 13 is naturally provided and appropriately formed for specifiable actuation or connection of the semiconductor arrangement 11.

Figure 4:
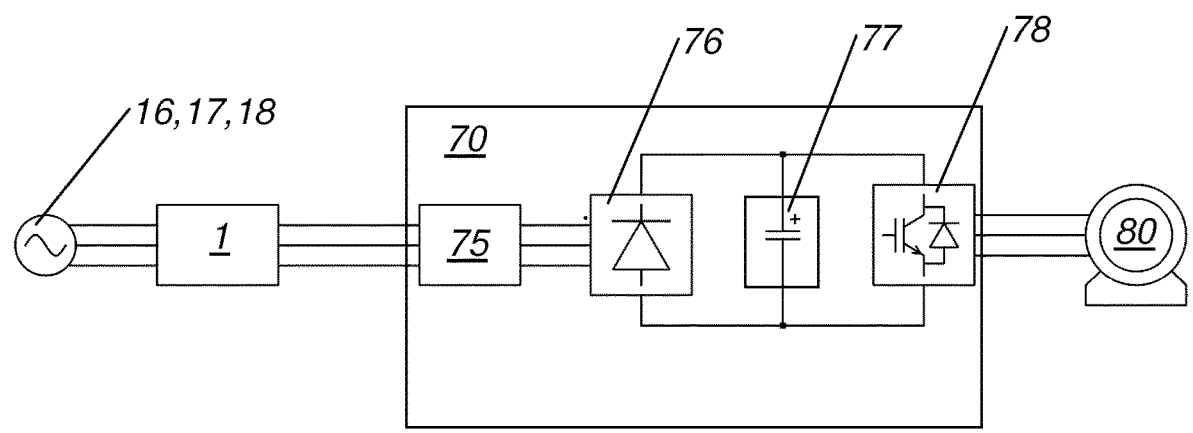
FIG. 4 is a schematic drawing of a second preferred embodiment of an electric motor connecting line.

FIGS. 2 and 4 show, as a further subject matter of the present invention, two embodiments of an electric motor connection line, a low-voltage protection switch unit 1 according to the invention being connected to a network terminal, denoted by reference numerals 16, 17, 18 in each of FIGS. 2 and 4. An electric motor 80 is connected to the low-voltage protection switch unit 1.

In the operation of an electric motor, as a result of the use of a low-voltage protection switch unit 1 according to the invention, any pieces of equipment that would otherwise be used can be omitted. As is shown in FIG. 2, the entire chain from the network terminal to the electric motor merely consists of a low-voltage protection switch unit 1 according to the invention. In the prior art, four units are typically required between the network and the electric motor 80, specifically a separate motor protection unit in each case and a power switch and a fuse arrangement and a motor starter. All of this can be omitted in the electrical installation according to the invention of an electric motor 80.

Only if it were desired to regulate the electric motor would a currently conventional inverter 78 or else a frequency converter 70 have to be provided. Otherwise, the arrangement found thus far can be omitted. As a result, a large number of units can be replaced with merely a single unit, and in this way the installation complexity can be greatly reduced.

FIG. 4 shows an arrangement in which merely a frequency converter 70 is arranged between the low-voltage protection switch unit 1 and the electric motor 80 in the circuitry. An input filter 75 is assigned to the frequency converter 70. In this context, the frequency converter 70 itself consists of a rectifier 76, a capacitor arrangement 77 downstream from this, also known as a capacitor bank, and an inverter 78 downstream from this, which may also be referred to as a DC-AC inverter. In this context, the capacitor arrangement 77 is part of the load as it appears for the low-voltage protection switch unit 1. As a result of the semiconductor circuit arrangement 11 being switched on/off in a specifiably clocked manner, the capacitor arrangement 77 can also be pre-charged in such a way that no further circuitry measures are required in this regard so as to charge it. The same also applies to the input filter 75, which may have energy stores such as in particular capacitors and which can also be pre-charged by the low-voltage protection switch unit 1 according to the invention without an increased switch-on current occurring as a result.

The statements relating to FIGS. 2 and 4 as regards the electric motor connection line and the associated description are each intended to relate in particular to a closed list. It is therefore particularly preferably provided that the associated electric motor connection lines actually have no further components, fuses being mentioned as the sole possible exception to this. In any case, no further switches are provided.

Hereinafter, a preferred embodiment of a method for setting an inductive or capacitive load 23 in operation is described, said load 23 being connected to a low-voltage protection switch unit 1 according to the invention.

In a first step, on the switched-off protection switch unit 1, a switch-on operating element is activated or a switch-on signal is received at an interface of the protection switch unit 1.

Subsequently, when the bypass switch 8 of the low-voltage protection switch unit 1 is open, the semiconductor circuit arrangement 11, which bridges the open mechanical bypass switch 8, is switched on/off in a specifiable clocked manner, during each half-wave of the powering alternating current, by the control unit 13 of the low-voltage protection switch unit 1 so as to limit the switch-on current of the load 23.

In this context, it is preferably provided that the semiconductor circuit arrangement 11 is switched on/off by the control unit 13 in accordance with a pulse-width modulation.

Once a substantially stable flow of current or a substantially stable power uptake via the low-voltage power switch unit 1 has been established, in other words once the power uptake of the load 23 has settled, the semiconductor circuit arrangement 11 is bridged by closing the mechanical bypass switch 8.

Preferably, it is further provided that a current measurement arrangement 12 measures a load current through the low-voltage power switch unit 1 and passes a current measurement result to the control unit 13.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A low-voltage protection switch unit comprising a motor protection switch, comprising:
   at least an external conductor line, from an external line supply terminal of the low-voltage protection switch unit to an external line load terminal of the low-voltage protection switch unit;
   a neutral conductor line, from a neutral conductor terminal of the low-voltage protection switch unit to a neutral conductor load terminal of the low-voltage protection switch unit;
   a mechanical bypass switch arranged in the external conductor line;
   a semiconductor circuit arrangement connected in parallel with the mechanical bypass switch;
   an electronic control unit configured to actuate the mechanical bypass switch and the semiconductor circuit arrangement in a specifiable manner; and
   a current measurement arrangement connected to the electronic control unit, the current measurement arrangement being arranged at least in the external conductor line,
   wherein the electronic control unit is configured to switch the semiconductor circuit arrangement on/off in a specifiable clocked manner when the mechanical bypass switch is open so as to limit a switch-on current of a downstream load.

2. The low-voltage protection switch unit according to claim 1, wherein the control unit is configured to switch the semiconductor circuit arrangement on/off in a specifiable manner, and
   wherein the specifiable manner comprises a pulse-width modulation.

3. The low-voltage protection switch unit according to claim 1, wherein the semiconductor circuit arrangement has at least one IGBT, the at least one IGBT comprising two back-to-back IGBTs, or at least one MOSFET, the at least one IGBT comprising a semiconductor switching element.

4. The low-voltage protection switch unit according to claim 1, wherein the electronic control unit is connected to the current measurement arrangement, and
   wherein the electronic control unit is configured to adapt on/off switching times as a function of a measured load current.

5. The low-voltage protection switch unit according to claim 1, wherein the electronic control unit is configured to actuate the mechanical bypass switch and the semiconductor circuit arrangement to switch off the low-voltage protection switch unit when specifiable electrical states occur, the specifiable electrical states comprising a surge or short-circuit current.

6. The low-voltage protection switch unit according to claim 1, wherein the semiconductor switching arrangement comprises a bidirectional H-bridge.

7. The low-voltage protection switch unit according to claim 1, further comprising mechanical disconnection contacts configured to provide specifiable galvanic interruption of the external conductor line and the neutral conductor line.

8. An electric motor connecting line, comprising:
   a network terminal; and
   the low-voltage protection switch unit according to claim 1 connected to the network terminal,
   wherein an electric motor is connected to the low-voltage protection switch unit.

9. The electric motor connecting line according to claim 8, further comprising an inverter or a frequency converter arranged between the low-voltage protection switch unit and the electric motor.

10. The electric motor connecting line according to claim 9, wherein the inverter or the frequency converter, alone, is arranged between the low-voltage protection switch unit and the electric motor.

11. The low-voltage protection switch unit according to claim 1, wherein the electronic control unit is configured to actuate the mechanical bypass switch and the semiconductor circuit arrangement in the specifiable manner, the specifiable manner comprising:
   based on an activation or receiving a switch-on signal, start switching the semiconductor circuit arrangement alternately on and off in the specifiable clocked manner,
   based on determining a predetermined condition, close the mechanical bypass switch, and
   after closing the mechanical bypass switch, stop switching the semiconductor circuit arrangement.

12. The low-voltage protection switch according to claim 1, wherein the predetermined condition comprises a substantially stable flow of a load current determined at the current measurement arrangement or a substantially stable power uptake determined for the low-voltage protection switch.

* * * * *